United States Patent
Grimm

(10) Patent No.: US 8,100,438 B2
(45) Date of Patent: Jan. 24, 2012

(54) EXHAUST OF A MOTOR VEHICLE

(75) Inventor: Manfred Grimm, Rüsselsheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 43 days.

(21) Appl. No.: 12/335,439

(22) Filed: Dec. 15, 2008

(65) Prior Publication Data

US 2009/0211832 A1  Aug. 27, 2009

(30) Foreign Application Priority Data

Dec. 14, 2007  (DE) .................. 10 2007 060 398

(51) Int. Cl.
  *F16L 13/08*  (2006.01)
  *F16L 13/14*  (2006.01)
(52) U.S. Cl. ............... 285/289.3; 285/289.1; 285/289.5; 285/382.1; 285/382.2; 29/890.08
(58) Field of Classification Search ............... 285/289.1, 285/289.2, 289.3, 289.4, 289.5, 382, 382.1, 285/382.2; 29/890.08; 454/2
See application file for complete search history.

(56) References Cited

U.S. PATENT DOCUMENTS

| | | | | |
|---|---|---|---|---|
| 333,726 A | * | 1/1886 | Brown | 285/148.7 |
| 1,801,171 A | * | 4/1931 | Mueller et al. | 285/289.5 |
| 1,901,820 A | * | 3/1933 | Parker | 285/93 |
| 1,933,915 A | * | 11/1933 | Lindquist et al. | 285/289.3 |
| 2,038,868 A | * | 4/1936 | Lindquist | 285/289.3 |
| 2,120,067 A | * | 6/1938 | Gray et al. | 285/289.5 |
| 2,377,378 A | * | 6/1945 | Saslaw | 285/238 |
| 2,504,625 A | * | 4/1950 | Blair et al. | 285/289.3 |
| 3,596,937 A | * | 8/1971 | Baldelli | 285/289.3 |
| 3,633,266 A | * | 1/1972 | Taylor | 228/173.4 |
| 3,750,248 A | * | 8/1973 | Morris | 228/154 |
| 3,921,754 A | * | 11/1975 | Hess | 181/212 |
| 4,396,213 A | * | 8/1983 | Hawkins | 285/289.3 |
| 4,541,655 A | * | 9/1985 | Hunter | 285/55 |
| 4,874,191 A | * | 10/1989 | Green | 285/332.3 |
| 4,941,690 A | * | 7/1990 | Bodine, Sr. | 285/38 |
| 5,042,847 A | * | 8/1991 | Lasecki et al. | 285/331 |
| 6,224,114 B1 | | 5/2001 | Franzen et al. | |
| 6,230,747 B1 | * | 5/2001 | Nakao et al. | 138/109 |
| 6,505,813 B1 | * | 1/2003 | Horne et al. | 251/148 |
| 6,581,983 B1 | * | 6/2003 | Viegener | 285/382 |
| 2002/0144400 A1 | * | 10/2002 | Baldwin | 29/890.08 |
| 2004/0201214 A1 | * | 10/2004 | Logan et al. | 285/351 |

FOREIGN PATENT DOCUMENTS

CN  1226310 C  1/2002

* cited by examiner

*Primary Examiner* — James Hewitt
(74) *Attorney, Agent, or Firm* — Ingrassia Fisher & Lorenz, P.C.

(57) ABSTRACT

An exhaust system of a motor vehicle includes, but is not limited to an inner exhaust pipe that is inserted into an outer exhaust pipe in an overlap region, and the two exhaust pipes are crimped in the overlap region.

8 Claims, 1 Drawing Sheet

EXHAUST OF A MOTOR VEHICLE

CROSS-REFERENCE TO RELATED APPLICATION

This application claims priority to German Patent Application No. 102007060398.5, filed Dec. 14, 2007, which is incorporated herein by reference in its entirety.

TECHNICAL FIELD

The invention relates to the exhaust of a motor vehicle.

BACKGROUND

A motor-vehicle exhaust has exhaust pipes, which must be connected to one another. If the pipe diameters are different, the pipes are inserted into one another and radially bracing pipe clamps are used. If the two pipes have the same diameter, the pipe ends may have flanges, which are screwed axially toward one another with an interposed seal.

It is at least one object of one embodiment of the invention to provide an exhaust system, whose exhaust pipes can be connected more rapidly using few parts. In addition, other objects, desirable features, and characteristics will become apparent from the subsequent summary and detailed description, and the appended claims, taken in conjunction with the accompanying drawings and this background.

SUMMARY

The at least one object, and other objects, desirable features and characteristics, is achieved a first embodiment in which the exhaust system of a motor vehicle comprises an inner exhaust pipe which is inserted into an outer exhaust pipe in an overlap region, and the two exhaust pipes are crimped in the overlap region.

Due to the crimping, a non-positive and/or positive connection is made, which may be implemented with extremely simple handling devices, in which the pipe length may be adjusted, and in which pipe clamps are omitted.

In a further embodiment, a circumferential crimping region is provided. On the one hand, a better mechanical connection is achieved and on the other hand, depending on the shaping of the crimping region, any twisting or change in shape may be prevented after joining.

It may further be provided that the outer pipe has an embossing at its outermost end lying in the overlap region. The embossing, which is directly radially outward on account of the displacement of the two exhaust pipes into one another or has a radially outward extension with respect to the outside diameter, is then used for the crimping by a suitable handling device. The handling device presses onto the embossing from outside during assembly, thus pressing the outer pipe onto the inner pipe and thereby making a clamped connection.

A semicircular bead may be selected as embossing so that the outermost end of the bead is pressed radially inward by a corresponding handling device and creates a non-positive connection with its outermost end.

Furthermore, an embodiment may be selected in which a soldering compound is received in the bead. In addition to the mechanical connection, the soldering compound may be liquefied by introducing heat and a positive connection may additionally be provided when the solder flows into the intermediate space between outer pipe and inner pipe due to the capillary effect.

In a further embodiment, a semicircular bead is provided. In this case, the connection between the two pipes is made at least substantially gastight in combination with the circumferentially sealing soldering compound and undesirable noise due to out flowing exhaust gases is avoided. If no soldering compound is provided, the circumferential bead forms a mechanically stable connection.

It may further be provided that the outer pipe has a second embossing in the overlap region. This second embossing that extends radially outward in the same way as the first embossing, is an assembly aid for fixing the outer pipe when crimping the two pipes.

Further features and advantages of the claimed invention can be identified from the following detailed description with reference to the appended drawings, which are specified hereinafter as nonrestrictive examples.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
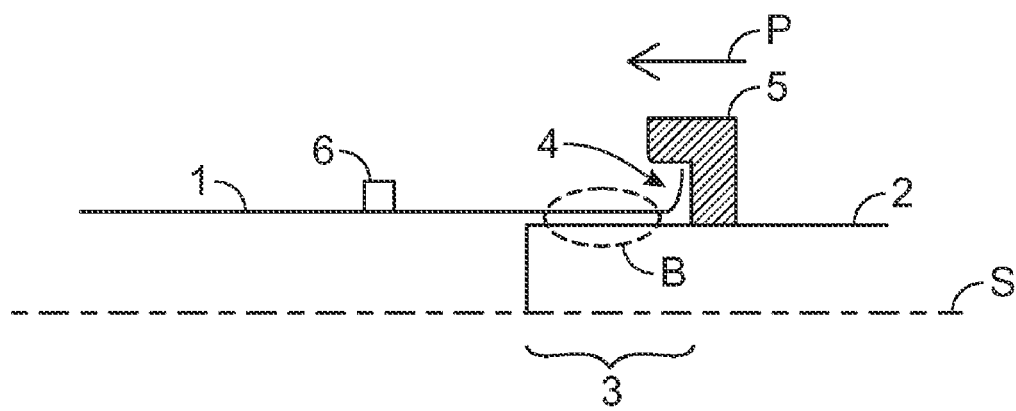
FIG. 1a shows two exhaust pipes in side view.

In the figures which generally designate the same objects with the same reference numerals, FIG. 1 shows a sectional view of two exhaust pipes 1 and 2 having a common axis of symmetry S, which pertain to an automobile exhaust. The pipe 2 is inserted into the pipe 1 in an overlap region 3, and the latter has an outwardly directed embossing 4.

For crimping, the handling device 5 is applied and moved in the direction of the arrow P. As a result, in region B the outer pipe 1 is pressed radially inward and thus onto the inner pipe 2. The outer pipe 1 may also have a second embossing 6 that serves as a support for holding the outer pipe 1 for a second handling device (not shown).

Figure 2A:
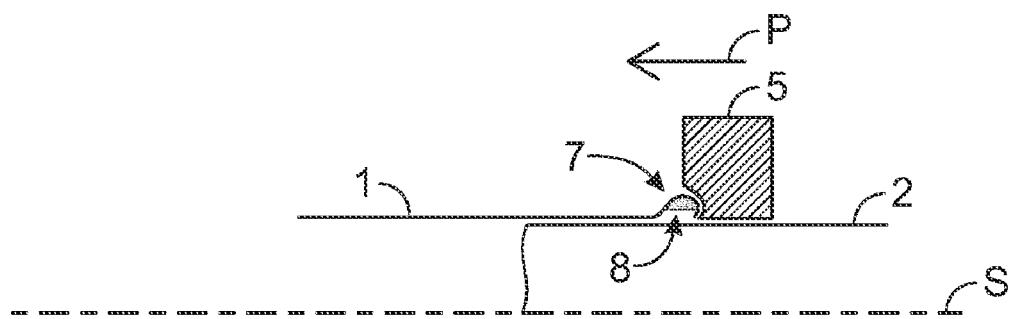
FIG. 2a shows two exhaust pipes in side view before crimping.
Figure 2B:
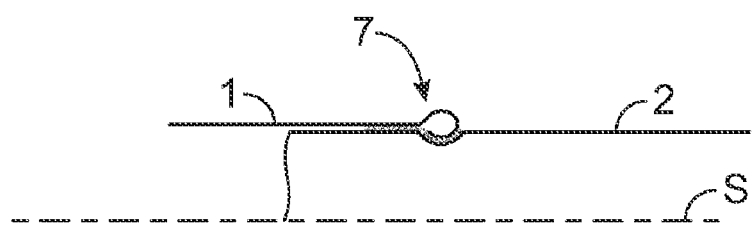
FIG. 2b shows the two exhaust pipes from FIG. 2a after crimping.

FIG. 2a show two pipes 1 and 2 inserted into one another, in which the outer pipe 1 has an embossing at the end, which is configured as a semicircular bead 7 containing a soldering compound 8. Under the simultaneous action of heat, a non-positive and flush and therefore also gastight connection is formed in the dotted region due to application of the handling device 5.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. An exhaust system of a motor vehicle, comprising:
an outer exhaust pipe; and
an inner exhaust pipe inserted into the outer exhaust pipe in an overlap region,
wherein the outer exhaust pipe has an embossing at an outermost end at least partially within in the overlap region,
wherein a semicircular bead is provided as the embossing,
wherein a soldering compound is disposed within the semicircular bead,
wherein the outer exhaust pipe and the inner exhaust pipe are crimped together in the overlap region, the outer exhaust pipe being crimped on the semicircular bead.

2. The exhaust system according to claim 1, further comprising a circumferential crimping region.

3. The exhaust system according to claim 1, wherein the semicircular bead is an annular bead around the outer pipe.

4. The exhaust system of claim 1, wherein the soldering compound is configured to be melted upon application of heat during the crimping to form a gastight connection within the overlap region.

5. An exhaust system of a motor vehicle, comprising:
an outer exhaust pipe; and
an inner exhaust pipe inserted into the outer exhaust pipe in an overlap region,
wherein the outer exhaust pipe has an embossing at an outermost end at least partially within in the overlap region,
wherein a semicircular bead is provided as the embossing,
wherein the semicircular bead is preloaded with a soldering compound prior to crimping,
wherein the outer exhaust pipe and the inner exhaust pipe are crimped together in the overlap region, the outer exhaust pipe being crimped on the semicircular bead.

6. The exhaust system according to claim 5, further comprising a circumferential crimping region.

7. The exhaust system according to claim 5, wherein the semicircular bead is an annular bead around the outer pipe.

8. The exhaust system of claim 5, wherein the soldering compound is configured to be melted upon application of heat during the crimping to form a gastight connection within the overlap region.

* * * * *